US011327636B2

(12) United States Patent
Pruitt et al.

(10) Patent No.: US 11,327,636 B2
(45) Date of Patent: May 10, 2022

(54) DYNAMICALLY SCALE COMPLEXITY OF A USER INTERFACE BASED ON COGNITIVE LOAD

(71) Applicant: Dell Products L.P., Round Rock, TX (US)

(72) Inventors: John S. Pruitt, Cedar Park, TX (US); Eric Summa, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 270 days.

(21) Appl. No.: 16/545,499

(22) Filed: Aug. 20, 2019

(65) Prior Publication Data

US 2021/0055841 A1 Feb. 25, 2021

(51) Int. Cl.
*G06F 3/0484* (2022.01)
*G06F 3/01* (2006.01)
*G06F 9/451* (2018.01)

(52) U.S. Cl.
CPC ............ *G06F 3/0484* (2013.01); *G06F 3/013* (2013.01); *G06F 9/453* (2018.02)

(58) Field of Classification Search
CPC ..... A61B 5/4064; A61B 5/0006; A61B 5/162; B60W 2540/22; G06F 3/00; G06F 3/048; G06F 3/013; G06F 19/34; G06F 21/32; G06F 2201/81; G06F 2201/88; G06F 2209/508; G06F 3/015; G06F 3/0484; G06F 9/453
See application file for complete search history.

(56) References Cited

U.S. PATENT DOCUMENTS

| | | | |
|---|---|---|---|
| 7,930,676 B1 * | 4/2011 | Thomas | G06F 9/44505 717/100 |
| 9,977,568 B2 * | 5/2018 | Mishra | G06F 3/04817 |
| 10,237,304 B1 * | 3/2019 | Sokolov | G06F 3/011 |
| 10,558,740 B1 * | 2/2020 | O'Malley | G06F 40/197 |
| 2009/0204881 A1 * | 8/2009 | Murthy | G06F 40/174 715/226 |
| 2010/0058185 A1 * | 3/2010 | Commarford | G06F 9/453 715/708 |
| 2010/0217097 A1 * | 8/2010 | Chen | A61B 5/16 600/301 |
| 2012/0226993 A1 * | 9/2012 | Bromer | H04M 1/72448 715/744 |
| 2013/0152001 A1 * | 6/2013 | Lovitt | G06F 9/451 715/765 |

(Continued)

*Primary Examiner* — Daniel Samwel
(74) *Attorney, Agent, or Firm* — Baker Botts L.L.P.

(57) ABSTRACT

Methods, systems, and computer programs encoded on computer storage medium, for providing, for display, a GUI on a display device; detecting biometric measurements associated with a user that is perceiving the current GUI; processing the biometric measurements to quantify a current cognitive load associated with the user, the current cognitive load responsive to the current GUI; comparing the current cognitive load that is responsive to the current GUI to a threshold cognitive load; determining that the current cognitive load that is responsive to the current GUI is greater than the threshold cognitive load; scaling down a complexity of the current GUI based on the current cognitive load that is responsive to the current GUI to generate an updated GUI; and providing, for display, the updated GUI on the display device.

19 Claims, 6 Drawing Sheets

(56) References Cited

U.S. PATENT DOCUMENTS

| | | | |
|---|---|---|---|
| 2014/0282646 A1* | 9/2014 | McCoy | H04N 21/44213 725/12 |
| 2016/0005320 A1* | 1/2016 | deCharms | A61B 8/0808 434/236 |
| 2016/0147425 A1* | 5/2016 | Baughman | G06F 9/451 715/745 |
| 2017/0046178 A1* | 2/2017 | Singh | G06F 3/017 |
| 2018/0089159 A1* | 3/2018 | Jain | G06F 40/186 |
| 2018/0325441 A1* | 11/2018 | DeLuca | G06F 11/328 |
| 2019/0057694 A1* | 2/2019 | Biswas | G06F 3/167 |
| 2021/0027013 A1* | 1/2021 | Leme | G06F 40/174 |

* cited by examiner

DYNAMICALLY SCALE COMPLEXITY OF A USER INTERFACE BASED ON COGNITIVE LOAD

BACKGROUND

Field of the Disclosure

The disclosure relates generally to information handling systems, and in particular, adjusting a complexity of a graphical user interface of the information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Today, computer users have an unprecedented amount of control over their computing devices and encompassed software experiences. Users can modify things such as CPU and GPU speeds, thermals, battery consumption, remapping of their keyboards, custom hardware lighting, screen color levels and saturation, as well as software features and UI preferences in the operating system and desktop applications. This can be useful for some users, while being overwhelming for other users. Currently, there is no method for users to dynamically scale a user interface to an individual's amount of complexity.

SUMMARY

Innovative aspects of the subject matter described in this specification may be embodied in a method including providing, for display, a current graphical user interface (GUI) on a display device; in response to providing the current GUI for display on the display device, detecting biometric measurements associated with a user that is perceiving the current GUI; processing the biometric measurements to quantify a current cognitive load associated with the user, the current cognitive load responsive to the current GUI; comparing the current cognitive load that is responsive to the current GUI to a threshold cognitive load; determining that the current cognitive load that is responsive to the current GUI is greater than the threshold cognitive load; in response to determining that the current cognitive load that is responsive to the current GUI is greater than the threshold cognitive load, scaling down a complexity of the current GUI based on the current cognitive load that is responsive to the current GUI to generate an updated GUI; and providing, for display, the updated GUI on the display device.

Other embodiments of these aspects include corresponding system, apparatus, and computer programs, configured to perform the actions of the methods, encoded on computer storage devices.

These and other embodiments may each optionally include one or more of the following features. For instance, detecting eye tracking of the user while perceiving the GUI. Detecting a retinal dilation and eye movement of the user while perceiving the GUI. Detecting additional biometric measurements associated with the user that are responsive to additional GUIs provided for display by the display device prior to display of the current GUI; processing the additional biometric measurements to establish a baseline cognitive load associated with the user; assigning the baseline cognitive load as the threshold cognitive load; and storing, in a database, data indicating the threshold cognitive load. A portion of the current GUI includes interactive elements, and wherein scaling down the complexity of the current GUI further includes removing one or more of the interactive elements of the portion of the current GUI to generate the updated GUI. Adding a helper overlay feature associated with the portion of the GUI to generate the updated GUI. A portion of the current GUI includes a granular interactive element, and wherein scaling down the complexity of the current GUI further includes replacing the granular interactive element with a predefined interactive elements. A portion of the current GUI includes interactive elements, and wherein scaling down the complexity of the current GUI further includes enlarging a first interactive element while concurrently reducing a second interactive element.

Innovative aspects of the subject matter described in this specification may be embodied in an information handling system including a display device that provides for display a graphical user interface (GUI); one or more biometric sensors to detect biometric measurements associated with a user that is perceiving the GUI; a cognitive load computing module configured to: process the biometric measurements to quantify a current cognitive load associated with the user, the current cognitive load responsive to the GUI; compare the current cognitive load that is responsive to the GUI to a threshold cognitive load; determine that the current cognitive load that is responsive to the GUI is greater than the threshold cognitive load; and in response to determining that the current cognitive load that is responsive to the GUI is greater than the threshold cognitive load, scale down a complexity of the GUI based on the current cognitive load that is responsive to the GUI to generate an updated GUI, wherein the display device provides for display the updated GUI.

Other embodiments of these aspects include corresponding method, apparatus, and computer programs, configured to perform the actions of the methods, encoded on computer storage devices.

These and other embodiments may each optionally include one or more of the following features. For instance, detecting eye tracking of the user while perceiving the GUI. Detecting a retinal dilation and eye movement of the user while perceiving the GUI. Detecting additional biometric measurements associated with the user that are responsive to additional GUIs provided for display by the display device prior to display of the current GUI; processing the additional biometric measurements to establish a baseline cognitive load associated with the user; assigning the baseline cognitive load as the threshold cognitive load; and storing, in a database, data indicating the threshold cognitive load. A portion of the current GUI includes interactive elements, and wherein scaling down the complexity of the current GUI further includes removing one or more of the interactive elements of the portion of the current GUI to generate the updated GUI. Adding a helper overlay feature associated with the portion of the GUI to generate the updated GUI. A portion of the current GUI includes a granular interactive element, and wherein scaling down the complexity of the current GUI further includes replacing the granular interactive element with a predefined interactive elements. A portion of the current GUI includes interactive elements, and wherein scaling down the complexity of the current GUI further includes enlarging a first interactive element while concurrently reducing a second interactive element.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
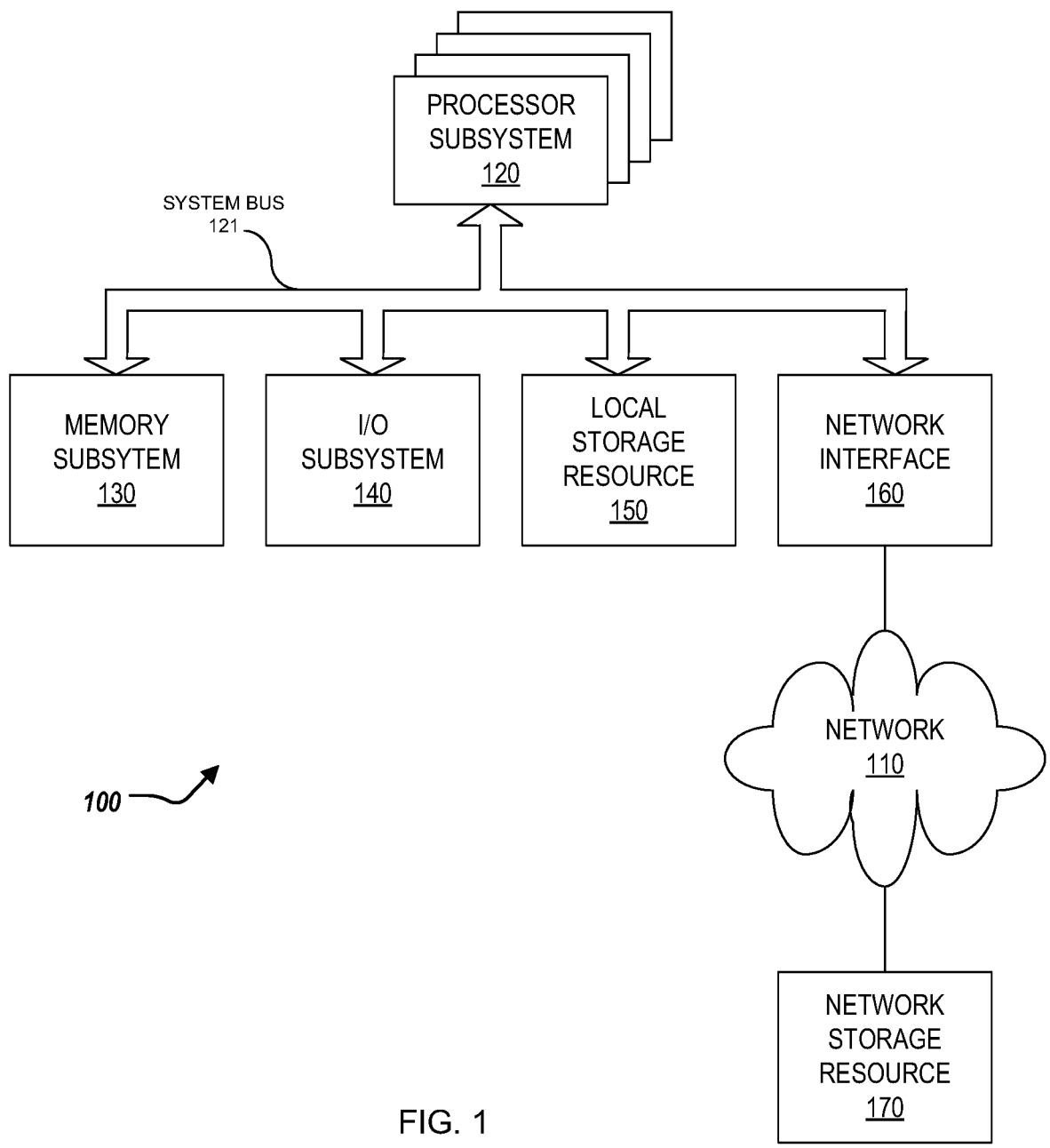
FIG. 1 is a block diagram of selected elements of an embodiment of an information handling system.

This document discusses a system and method to dynamically scale a complexity of a graphical user interface (GUI) based on cognitive load (CL). Specifically, the system can utilize biometrics to establish a retinal dilation and eye movement baseline of a user to assess their cognitive load when viewing the GUI. In response to the detected cognitive load, the system can scale the complexity of the GUI based on the CL, including i) tiered complexity/helper text, ii) swapping one UI component for another, iii) minimizing and scaling UI components/layouts, and iv) reducing the complexity for other sensory modalities (e.g., audio, lighting, haptics).

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-6 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Figure 2:
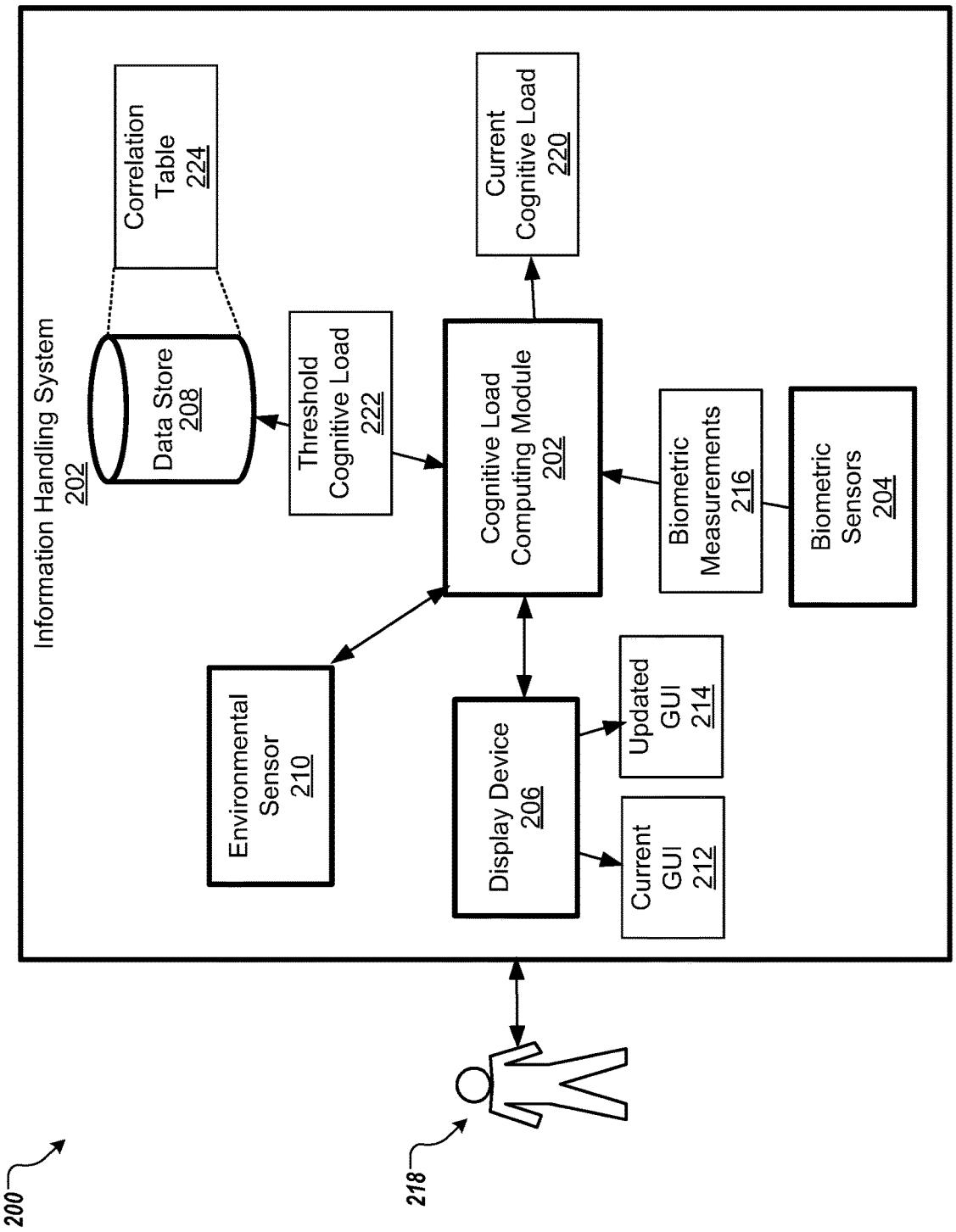
FIG. 2 is a block diagram of an information handling system for adjusting a complexity of a graphical user interface.

Turning now to FIG. 2, FIG. 2 illustrates a computing environment 200 for adjusting a complexity of a GUI. The computing environment 200 includes at least a portion of an information handling system (IHS) 200. The IHS 200 can include a cognitive load computing module 202, biometric sensors 204, a display device 206, a data store 208, and an environmental sensor 210. The cognitive load computing module 202 can be in communication with the biometric sensors 204, the display device 206, the data store 208, and the environmental sensor 210. In some examples, the IHS 200 can be similar to the information handling system 100 of FIG. 1.

In some implementations, the display device 206 provides for display a current graphical user interface (GUI) 212. The current GUI 212 can display interactive elements associated with a computer-executable program that is currently being executed by the IHS 200. For example, the GUI 212 can relate to a gaming computer-executable program or an electronic mail computer-executable program.

In some implementations, the biometric sensors 204 can detect biometric measurements 216 that are associated with a user 218 that is perceiving the current GUI 212. That is, in response to the display device 206 providing the current GUI 212, the biometric sensors 204 can detect biometric measurements 216 of the user 218 while the user 218 is perceiving (e.g., watching or interacting with) the current GUI 212. For example, the biometric sensors 204 can include an eye-tracking biometric sensor. The eye-tracking biometric sensor can detect eye tracking of the user 218 while the user 218 is perceiving the current GUI 212. In some examples, the eye-tracking biometric sensor can detect a retinal dilation and eye movement of the user 218 while the user 218 is perceiving the current GUI 212. In some examples, the eye-tracking biometric sensor can detect such eye movement patterns including fixation, duration, and frequency of psychotic movements. In some examples, the biometric sensors 204 can include a heart rate sensor to detect such biometric measurements as heart rate.

In some examples, the IHS 200 can include a hand-held pointing device (e.g., computing mouse) for interaction by the user 218 with the display device 206. The biometric sensors 204 can include detecting perspiration of the user 218 while using the hand-held point device and perceiving (or interacting with) the current GUI 212 as the biometric measurements 216. Further, in some examples, other sensors can detect motion of the hand-held pointing device, including complexity of the movement of the hand-held point device, an amount of jitter/hop with such movements, and target accuracy that can be coupled with the biometric measurements 216.

In some examples, the biometric sensors 204 can include a camera (e.g., 2D or 3D). The camera can facilitate detection of facial recognition of the user 218 while the user 218 is perceiving the current GUI 212. The camera can facilitate detecting such facial patterns, and changes thereof in response to the current GUI 212.

The biometric sensors 204 provide the biometric measurements 216 to the cognitive load computing module 202. In some examples, the biometric sensors 204 provide the biometric measurements 216 to the cognitive load computing module 202 in response to a request, or automatically (e.g., every 1 millisecond, 1 second, 1 minute). In some examples, the biometric sensors 204 provide a subset of the biometric measurements 216 to the cognitive load computing module 202.

In some implementations, the cognitive load computing module 202 can process the biometric measurements 216 to quantify a current cognitive load 220 associated with the user 218. The current cognitive load 220 is responsive to the current GUI 212. In some examples, processing the biometric measurements 216 by the cognitive load computing module 202 can include comparing the current cognitive load 220 that is responsive to the current GUI 212 to a threshold cognitive load 222. Specifically, the cognitive load computing module 202 can communicate with the data store 208 to identify a correlation table 222 that is stored by the data store 208. The correlation table 222 can include, for the user 208, one or more threshold cognitive loads. The threshold cognitive loads can be based on i) the user 208 and ii) the current computer-executable program that is provided for display by the display device 206. That is, the threshold cognitive loads can be customized to each user, as well as customized to each computer-executable program that is provided for display by the display device 206. To that end, the cognitive load computing module 202 can identify the threshold cognitive load 222 that is associated with the user 218 and for the computer-executable program that is provided for display by the current GUI 212.

In some implementations, the cognitive load computing module 202 can, based on comparing the current cognitive load 220 to the threshold cognitive load 222, determine that the current cognitive load 220 is greater than the threshold cognitive load 222. In response, the cognitive load computing module 202 can scale down a complexity of the current GUI 212 based on the current cognitive load 220 to generate an updated GUI 214.

Figure 3A:
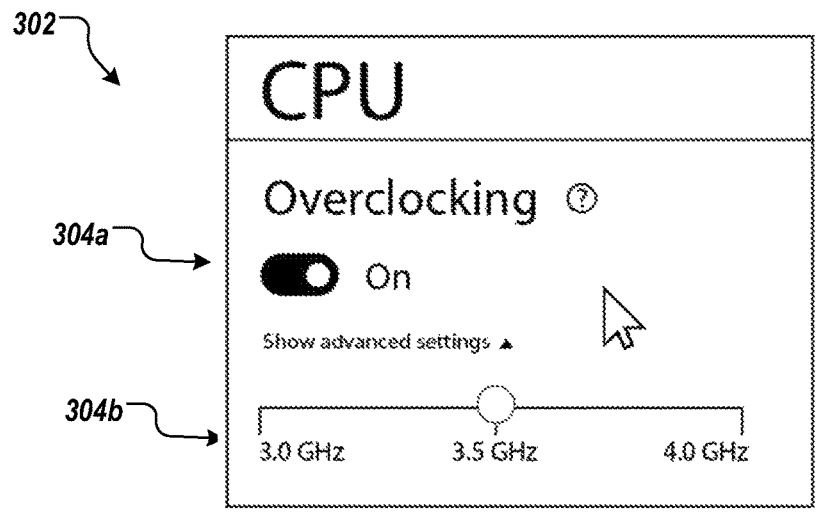
FIGS. 3A, 4A, 5A illustrate a graphical user interface prior to adjusting the complexity.

For example, FIG. 3A illustrates an example current GUI 302 (e.g., similar to the current GUI 212). The current GUI 302 can include interactive elements 304a, 304b (collectively referred to as interactive elements 304). The interactive elements 304a can include a switch between "on" and "off" for a particular function—e.g., "overclocking"—that is associated with the computer-executable program that is associated with the current GUI 302. For example, the user 218 can provide input to the IHS 200 to select the state of the switch of the interactive element 304a. The interactive element 304b can include a slider between 3 different options for a particular function—e.g., overclocking speed—that is associated with the computer-executable program that is associated with the current GUI 302. For example, the user 218 can provide input to the IHS 200 to select the state of the slider of the interactive element 304b. When the current cognitive load 220 is less than the threshold cognitive load 222 (or prior to determining the current cognitive load 220), the display device 206 can provide for display the current GUI 302.

Figure 3B:
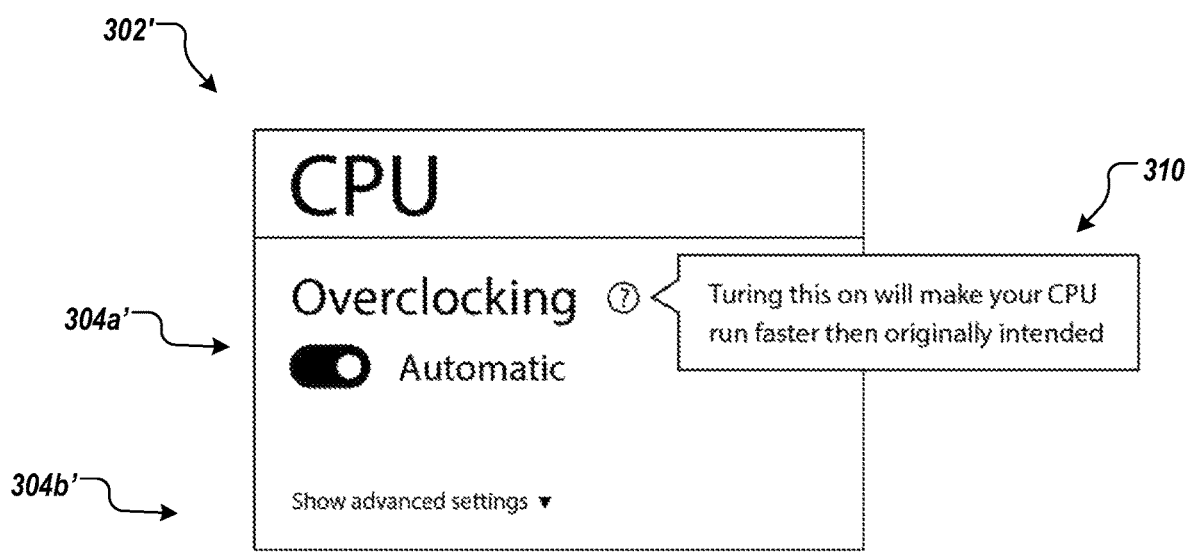
FIGS. 3B, 4B, 5B illustrate a graphical user interface after adjusting the complexity.

Referring to FIG. 3B, when the cognitive load computing module 202 determines that the current cognitive load 220 is greater than the threshold cognitive load 222, the display device 206 provides for display an updated GUI 302' (e.g., similar to the updated GUI 214). Specifically, the cognitive load computing module 202 can adjust the current GUI 302 to scale down the complexity of the current GUI 302 by removing interactive element 304b. That is, the interactive element 304b can be replaced with an interactive element 304b'. The interactive element 304b' can include a "simpler" version of the interactive element 304b in that less information is visually displayed while allowing the options of the interactive lament 304b to be conveyed. Specifically, the interactive element 304b' can include a selectable dialogue box that includes the words "Show advanced setting" such that when selected by the user 218 interacting with the IHS 200, can provide the interactive element 304b (or similar). Thus, the interactive element 304b' provides a scaled down complexity of the interactive element 304b. In other words, the updated GUI 302' can "hide" the interactive element 304b reducing the complexity of the updated GUI 302' and replacing such with the interactive element 304b'.

Additionally, the cognitive load computing module 202 can adjust the current GUI 302 to scale down the complexity of the current GUI 302 by updating the interactive element 304a. Specifically, the interactive element 304a' can be provided as an update to the interactive element 304a. The interactive element 304a' can include a switch to enable or disable an "automatic" function—e.g., "overclocking"—that is associated with the computer-executable program that is associated with the updated GUI 302'. The interactive element 304a' can provide "simpler" interface for the use 218 to interact with—as opposed to actively selecting between "on" and "off" states with interactive element 304a—the interact element 304a' provides the "automatic" selection of such function.

Additionally, the cognitive load computing module 202 can adjust the current GUI 302 to scale down the complexity of the current GUI 302 by including a helper overlay feature 310 within the updated GUI 302'. The helper overlay feature 310 can include a dialog box that includes additional information regarding the updated GUI 302'.

Figure 4A:
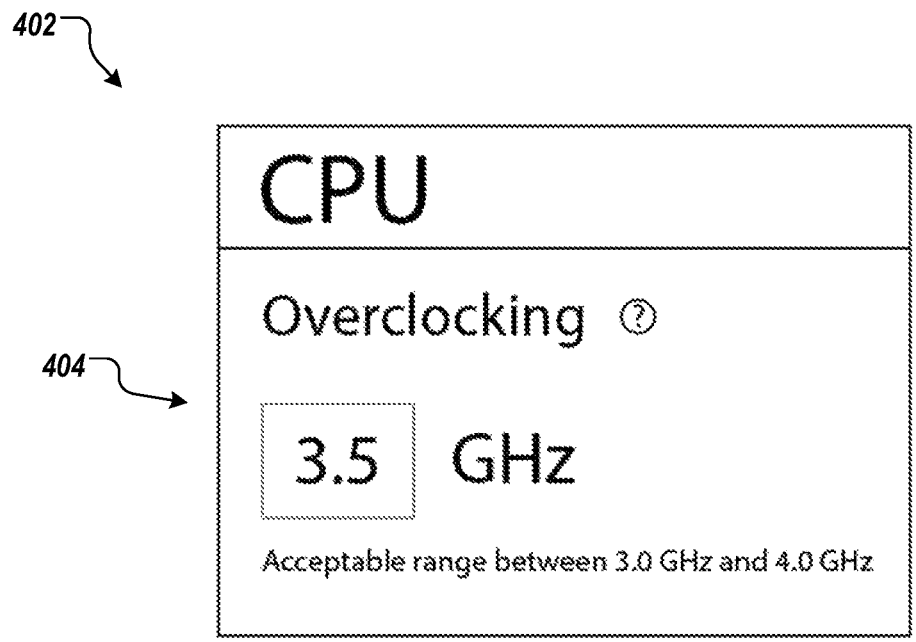

For example, FIG. 4A illustrates an example current GUI 402 (e.g., similar to the current GUI 202). The current GUI 402 can include an interactive element 404. The interactive element 404 can include an input box for a particular function—e.g., overclocking speed—that is associated with the computer-executable program that is associated with the current GUI 402. For example, the user 218 can provide input to the IHS 200 to select the overclocking speed of the interactive element 404. When the current cognitive load 220 is less than the threshold cognitive load 222 (or prior to determining the current cognitive load 220), the display device 206 can provide for display the current GUI 402.

Figure 4B:
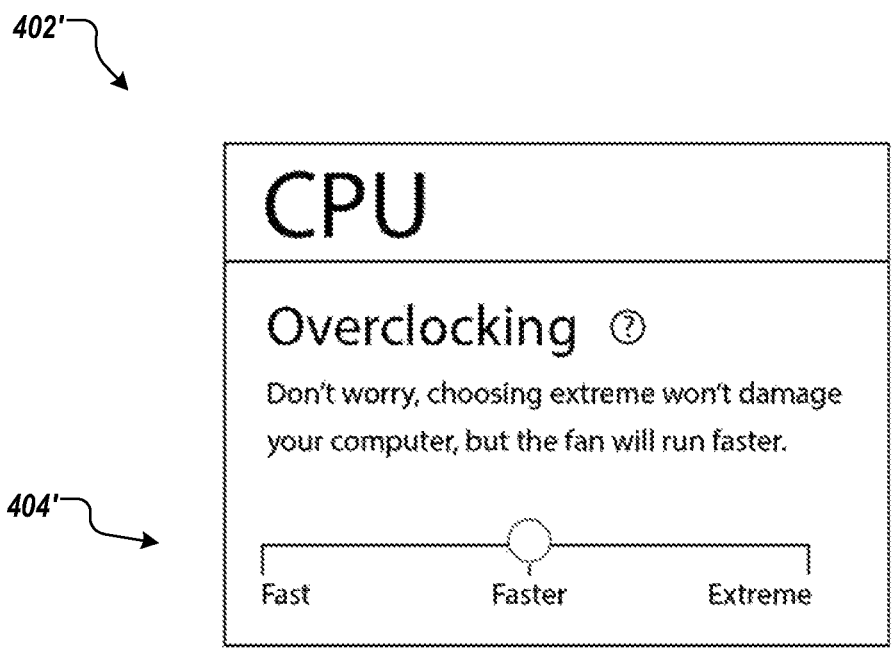

Referring to FIG. 4B, when the cognitive load computing module 202 determines that the current cognitive load 220 is greater than the threshold cognitive load 222, the display device 206 provides for display an updated GUI 402' (e.g., similar to the updated GUI 214). Specifically, the cognitive load computing module 202 can adjust the current GUI 402 to scale down the complexity of the current GUI 402 by replacing the granular interactive element 404 with a pre-defined interactive element 404'. The interactive element 404' can include a "simpler" version of the interactive element 404 in that the interactive element 404' includes a slider between 3 different options for a particular function—e.g., overclocking speed—that is associated with the computer-executable program that is associated with the current GUI 402. For example, the slider includes options "Fast," "Faster," and "Extreme." The limited options of only 3 selections of the interactive element 404' as opposed to the multiple options provided by the interactive element 404 provides a scaled down complexity of the current GUI 402 by the updated GUI 402'.

Figure 5A:
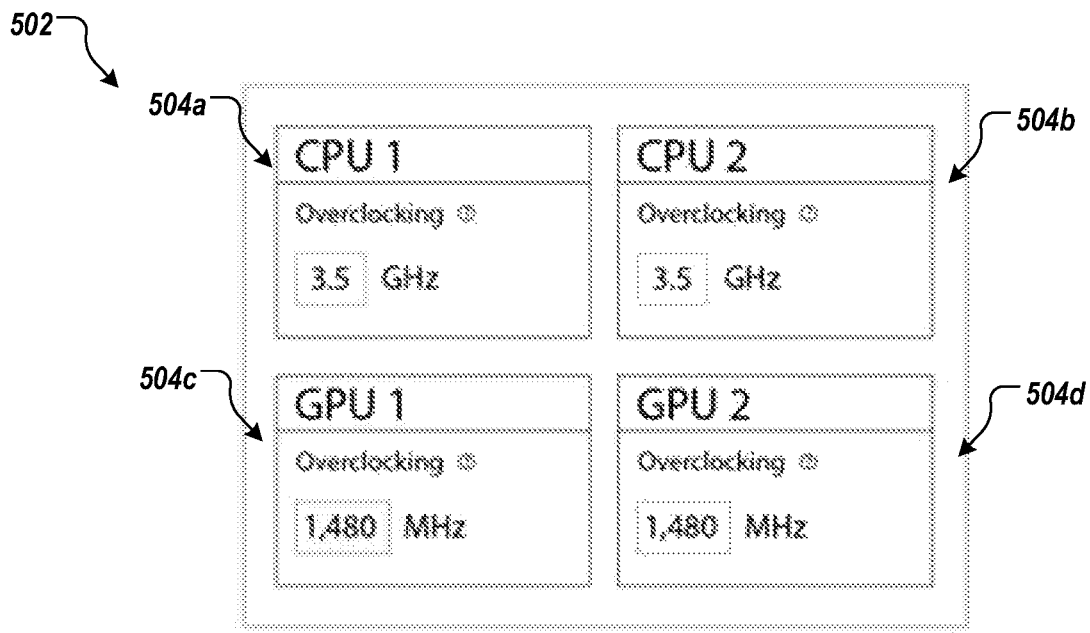

For example, FIG. 5A illustrates an example current GUI 502 (e.g., similar to the current GUI 202). The current GUI 502 can include an interactive elements 504a, 504b, 504c, 504d (collectively referred to as interactive elements 504). The interactive element 504 can include an input box for a particular function—e.g., overclocking speed of each CPU and GPU—that is associated with the computer-executable program that is associated with the current GUI 402. For example, the user 218 can provide input to the IHS 200 to select the overclocking speed of one or more of the interactive elements 504. When the current cognitive load 220 is less than the threshold cognitive load 222 (or prior to determining the current cognitive load 220), the display device 206 can provide for display the current GUI 502.

Figure 5B:
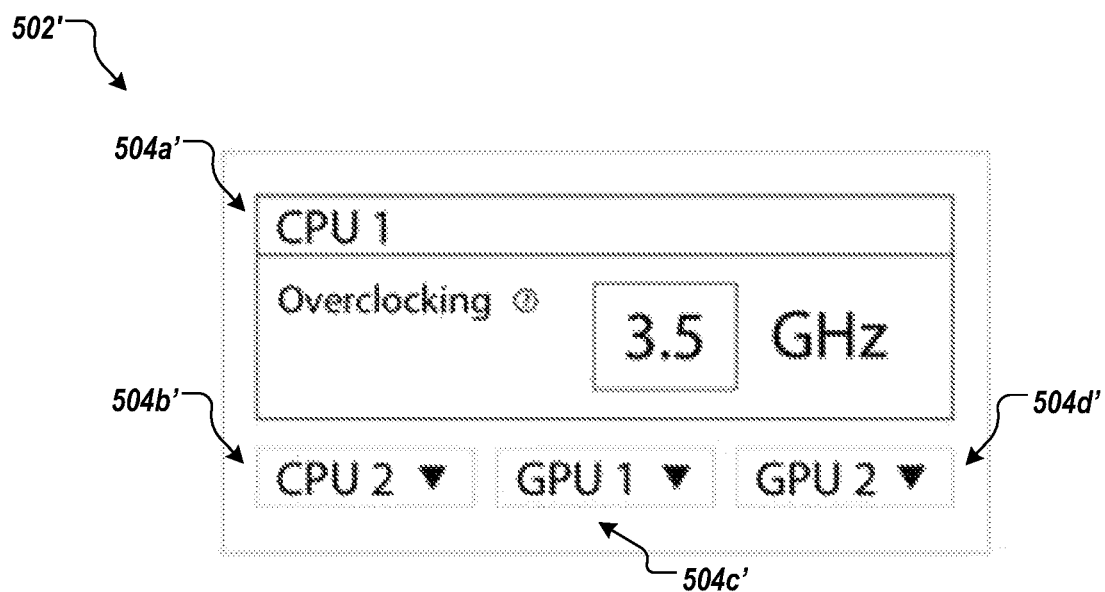

Referring to FIG. 5B, when the cognitive load computing module 202 determines that the current cognitive load 220 is greater than the threshold cognitive load 222, the display device 206 provides for display an updated GUI 502' (e.g., similar to the updated GUI 214). Specifically, the cognitive load computing module 202 can adjust the current GUI 502 to scale down the complexity of the current GUI 502 by enlarging the interactive element 504a while concurrently reducing a size of the interactive elements 504b, 504c, 504d. Specifically, the interactive element 504a can be expanded that the user 218 is interacting with to provide the interactive element 504a' while minimizing the remaining interactive elements 504b, 504c, 504d providing interactive elements 504b', 504c', 504d', respectively. Additionally, the input box from each of the interactive elements 504b, 504c, 504d can be removed to further scale down the complexity of the current GUI 502 while providing the updated GUI 502' including the interactive elements 504b', 504c', 504d'.

The display driver 208 can provide further for display the updated GUI 214.

In some examples, the cognitive load computing module 202 can determine a baseline cognitive load for the user 218. For example, the baseline cognitive load can be established across use of the IHS 200 during "regular" use and across a variety of computer-executable programs. In some examples, the baseline cognitive load can be implemented as the threshold cognitive load 222. Specifically, the biometric sensors 204 can detect additional biometric measurements associated with the user 218 that are responsive to additional GUIs provided for display by the display device 206 prior to display of the current GUI 212, similar to that above with respect to the biometric measurements 216 and the current GUI 212. The cognitive load computing module 202 can process the additional biometric measurements to establish the baseline cognitive load associated with the user 218. The cognitive load computing module 202 can assign the baseline cognitive load as the threshold cognitive load 222, and store such threshold cognitive load 222 in the correlation table 224 of the data store 208.

In some examples, the environmental sensors 210 can detect ambient lighting of an environment of the IHS 200 and the user 218, including color temperature and brightness. The environmental sensors 210 can provide such data reflecting such environmental conditions of the environment to the cognitive load computing module 202. The cognitive load computing module 202 can further quantify the current cognitive load 220 based on such environmental conditions.

In some examples, in response to the current cognitive load 220 being greater than the threshold cognitive load 222, the cognitive load computing module 202 can further adjust audio provided by the IHS 202 (e.g., that is provided in coordination with display of the updated GUI 214 by the display device 206). In some examples, adjusting the audio can including slowing a tempo of the audio, reducing complexity of the audio, and/or reducing a volume of the audio provided by the IHS 200. In some examples, responsive to the current cognitive load 220 being greater than the threshold cognitive load 222, the cognitive load computing module 202 can further adjust the current GUI 212 by adjusting the color temperature, hues, and/or brightness of the current GUI 212 to provide the updated GUI 214 by the display device 206. In some examples, response to the current cognitive load 220 being greater than the threshold cognitive load 222, the cognitive load computing module 202 can further reduce haptic intensity provided by the IHS 200, including reducing the haptic intensity to zero.

Figure 6:
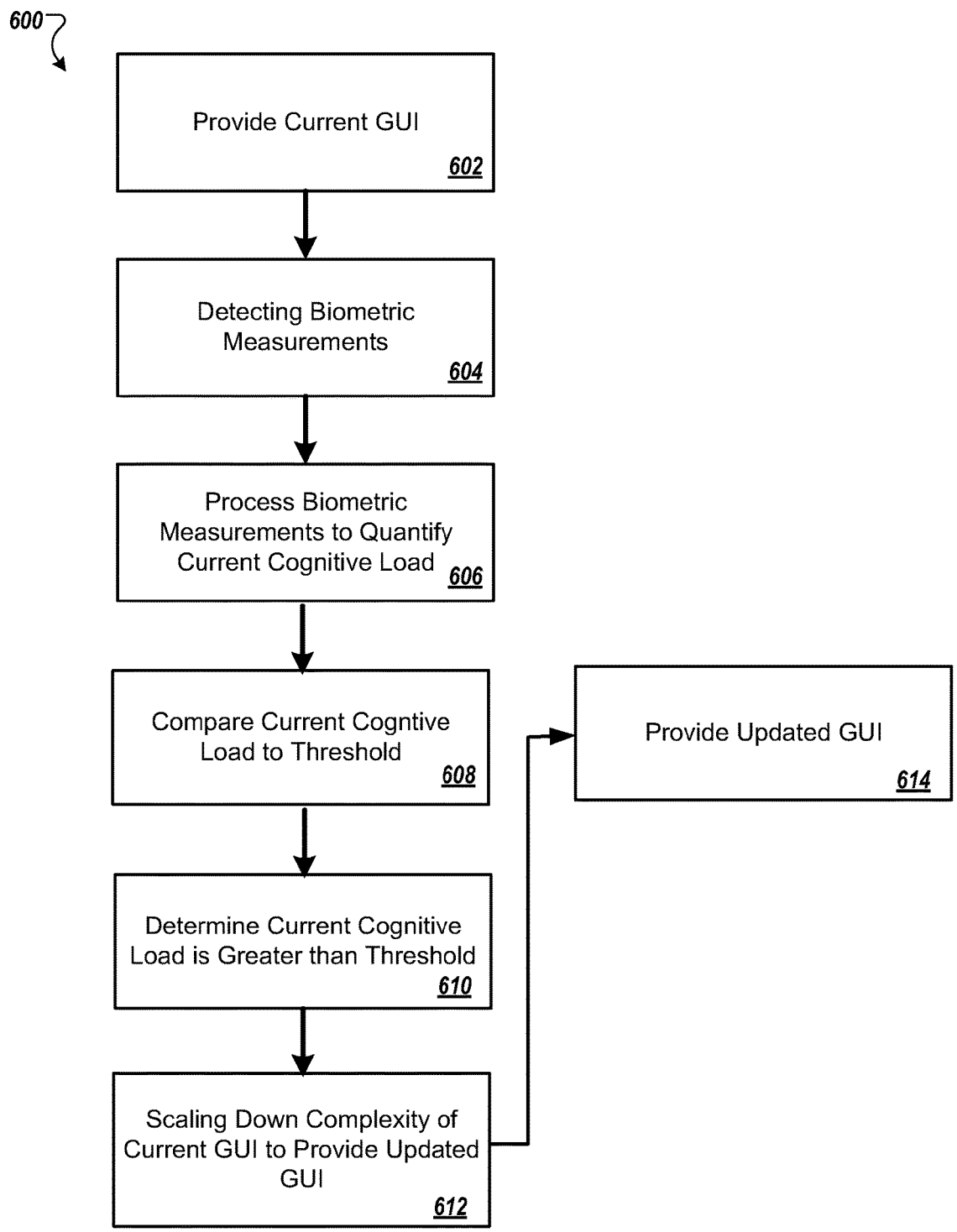
FIG. 6 is a flowchart for adjusting a complexity of a graphical user interface.

FIG. 6 illustrates a flowchart depicting selected elements of a method 600 for adjusting a complexity of a GUI. The method 600 may be performed by the information handling system 100, the IHS 200, and/or the cognitive load computing module 202, described herein with reference to FIGS. 1 and 2, or another information handling system. It is noted that certain operations described in method 600 may be optional or may be rearranged in different embodiments.

The display device 206 provides for display the current GUI 212 (602). In response to the display device 206 providing the current GUI 212, the biometric sensors 204 detect biometric measurements 216 that are associated with a user 218 that is perceiving the current GUI 212 (604). The cognitive load computing module 202 can process the biometric measurements 216 to quantify a current cognitive load 220 associated with the user 218 (606). The cognitive load computing module 202 compares the current cognitive load 220 that is responsive to the current GUI 212 to a threshold cognitive load 222 (608). The cognitive load computing module 202 can, based on comparing the current cognitive load 220 to the threshold cognitive load 222, determine that the current cognitive load 220 is greater than the threshold cognitive load 222 (610). In response to determining that the current cognitive load 220 is greater than the threshold cognitive load 222, the cognitive load computing module 202 can scale down a complexity of the current GUI 212 based on the current cognitive load 220 to generate an updated GUI 214 (612). The display driver 208 can provide further display the updated GUI 214 (614).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method, comprising:
   storing, in a database, data indicating a threshold cognitive load for a user;
   providing, for display, a graphical user interface (GUI) on a display device, the GUI displaying a set of interactive elements arranged in a first layout, wherein the set of interactive elements is associated with a computer-executable program being executed by an information handling system displaying the GUI, wherein each interactive element is configured to receive user input corresponding to a function of the information handling system executing the program, wherein a complexity is associated with the GUI;
   detecting a set of biometric measurements associated with the user perceiving the GUI;
   processing the biometric measurements to quantify a cognitive load associated with the user perceiving the GUI;
   comparing the cognitive load responsive to the user perceiving the GUI to the threshold cognitive load;
   determining that the current cognitive load responsive to the user perceiving the GUI is greater than the threshold cognitive load;
   in response to determining that the cognitive load responsive to the user perceiving the GUI is greater than the threshold cognitive load, scaling down the complexity of the GUI, including:
      enlarging a size of a first interactive element of the set of interactive elements and concurrently reducing a size of the remaining interactive elements of the set of interactive elements; and
   executing the program based on the set of functions; and
   providing, for display on the display device, the GUI with the scaled down complexity.

2. The computer-implemented method of claim 1, wherein detecting the set of biometric measurements associated with the user includes eye tracking of the user perceiving the GUI.

3. The computer-implemented method of claim 2, wherein eye tracking of the user perceiving the GUI includes detecting one or more of a retinal dilation and an eye movement of the user perceiving the GUI.

4. The computer-implemented method of claim 1, further comprising:
   detecting biometric measurements associated with the user that are responsive to a plurality of GUIs provided for display by the display device prior to display of the GUI;
   processing the biometric measurements associated with the user that are responsive to the plurality of GUIs to establish a baseline cognitive load associated with the user;
   assigning the baseline cognitive load as the threshold cognitive load; and
   storing, in the database prior to displaying the GUI, the data indicating the threshold cognitive load.

5. The computer-implemented method of claim 4, wherein:
   each GUI of the plurality of GUIs is associated with a respective computer-executable program of a plurality of computer-executable programs; and
   processing the biometric measurements to quantify the cognitive load associated with the user based on the plurality of computer-executable programs.

6. The computer-implemented method of claim 1, wherein scaling down the complexity of the GUI includes adding a helper overlay feature to the GUI.

7. The computer-implemented method of claim 1, wherein the interactive element comprises a switch, the method further comprising:
   selecting a first user input option of the switch turns on an automatic selection of the function by the information handling system; and
   selecting a second user input option of the switch turns off the automatic selection of the function by the information handling system and provides a granular interactive element.

8. The computer-implemented method of claim 1, wherein each of the interactive elements includes an input box element, the method further comprising:
   in response to determining that the cognitive load responsive to the user perceiving the GUI is greater than the threshold cognitive load, scaling down the complexity of the GUI, including:
      enlarging the size of a first interactive element of the set of interactive elements and concurrently i) reducing a size of the remaining interactive elements of the set of interactive elements and ii) removing the input boxes from the remaining interactive elements.

9. An information handling system, comprising:
   a display device that provides for display of a graphical user interface (GUI), the GUI displaying a set of interactive elements arranged in a first layout, wherein the set of interactive elements is associated with a computer-executable program being executed by an information handling system displaying the GUI, wherein each interactive element is configured to receive user input corresponding to a function of the information handling system executing the program, wherein a complexity is associated with the GUI;
one or more biometric sensors to detect a set of biometric measurements associated with a user perceiving the GUI;
a processor; and
a computer readable medium storing instructions that, when executed by the processor, cause the processor to:
process the set of biometric measurements to quantify a cognitive load associated with the user perceiving the GUI;
compare the cognitive load associated with the user perceiving the GUI to a threshold cognitive load stored in the memory medium;
determine that the cognitive load associated with the user perceiving the GUI is greater than the threshold cognitive load; and
in response to determining that the cognitive load associated with the user perceiving the GUI is greater than the threshold cognitive load, scale down the complexity of the GUI, including:
enlarge a size of a first interactive element of the set of interactive elements and concurrently reducing a size of the remaining interactive elements of the set of interactive elements; and
execute the program based on the set of functions; and
provide, for display, the GUI with the scaled down complexity.

10. The information handling system of claim 9, wherein the one or more biometric sensors are configured for eye tracking of the user perceiving the GUI.

11. The information handling system of claim 10, wherein the one or more biometric sensors are configured for detecting one or more of a retinal dilation and an eye movement of the user perceiving the GUI.

12. The information handling system of claim 9, wherein the set of instructions, when executed by the processor, cause the processor to:
provide, for display, a plurality of GUIs;
detect biometric measurements associated with the user that are responsive to each GUI of the plurality of GUIs;
processing the biometric measurements associated with the user that are responsive to each GUI of the plurality of GUIs to establish a baseline cognitive load associated with the user;
assigning the baseline cognitive load as the threshold cognitive load; and
storing, in a database in the memory medium, data indicating the threshold cognitive load.

13. The information handling system of claim 12, wherein:
each GUI of the plurality of GUIs is associated with a respective computer-executable program of a plurality of computer-executable programs; and
the set of instructions, when executed by the processor, cause the processor to process the biometric measurements to quantify the cognitive load associated with the user based on the plurality of computer-executable programs.

14. The information handling system of claim 9, wherein the set of instructions, when executed by the processor, cause the processor to add a helper overlay feature to the GUI.

15. The information handling system of claim 9, wherein:
the interactive element having a set of predefined user input options comprises a switch, the operations further comprising:
selecting a first user input option of the switch turns on an automatic selection of the function by the information handling system; and
selecting a second user input option of the switch turns off the automatic selection of the function by the information handling system and provides a granular interactive element.

16. A non-transitory computer-readable medium storing software comprising instructions executable by one or more computers which, upon such execution, cause the one or more computers to perform operations comprising:
providing, for display, a graphical user interface (GUI) on a display device, the GUI comprising a set of interactive elements arranged in a first layout, wherein the set of interactive elements is associated with a computer-executable program being executed by the one or more computers, wherein each interactive element is configured to receive user input corresponding to a function of the information handling system executing the program, wherein a complexity is associated with the GUI;
in response to providing the GUI, detecting biometric measurements associated with a user perceiving the GUI;
processing the biometric measurements to quantify a cognitive load associated with the user perceiving the GUI;
comparing the cognitive load responsive to the GUI to a threshold cognitive load stored in the non-transitory computer-readable medium;
determining that the cognitive load responsive to the GUI is greater than the threshold cognitive load;
in response to determining that the cognitive load responsive to the GUI is greater than the threshold cognitive load, scaling down the complexity of the GUI, including:
enlarging a size of a first interactive element of the set of interactive elements and concurrently reducing a size of the remaining interactive elements of the set of interactive elements; and
executing the program based on the set of functions; and
providing, for display, the GUI with the scaled down complexity.

17. The computer-readable medium of claim 16, wherein detecting the set of biometric measurements associated with the user includes eye tracking of the user perceiving the GUI.

18. The computer-readable medium of claim 17, wherein detecting eye tracking of the user perceiving the GUI includes detecting one or more of a retinal dilation and an eye movement of the user while perceiving the GUI.

19. The computer-readable medium of claim 16, the operations further comprising:
providing, for display, a plurality of GUIs, wherein each GUI of the plurality of GUIs is associated with a respective computer-executable program of a plurality of computer-executable programs;
detecting biometric measurements associated with the user that are responsive to each GUI of the plurality of GUIs;

processing the biometric measurements associated with the user that are responsive to each GUI of the plurality of GUIs to establish a baseline cognitive load associated with the user;

assigning the baseline cognitive load as the threshold cognitive load; and storing, in a database in the non-transitory computer-readable medium, data indicating the threshold cognitive load.

\* \* \* \* \*